Figure 6:
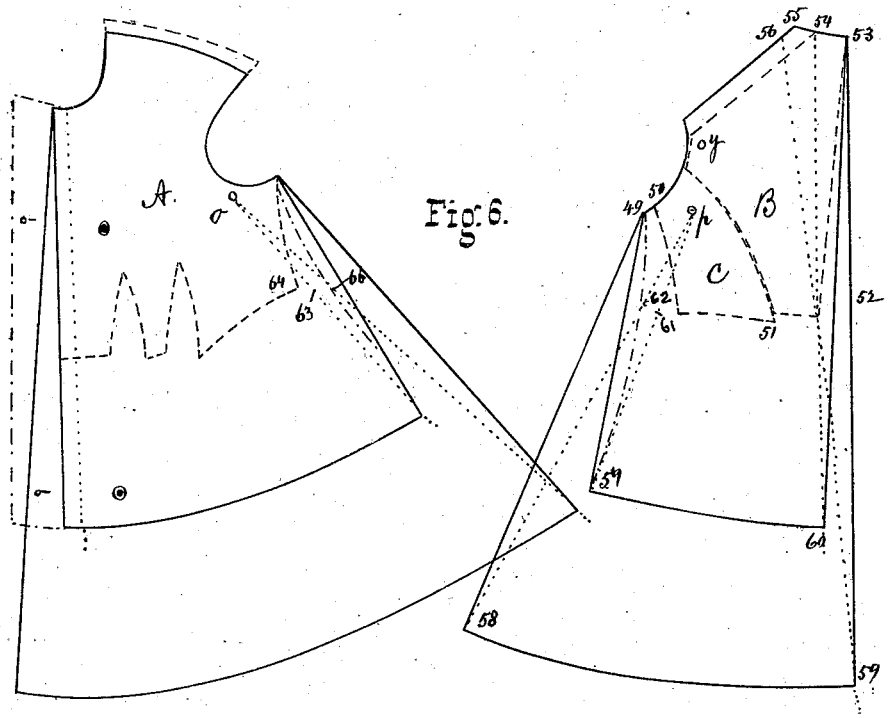

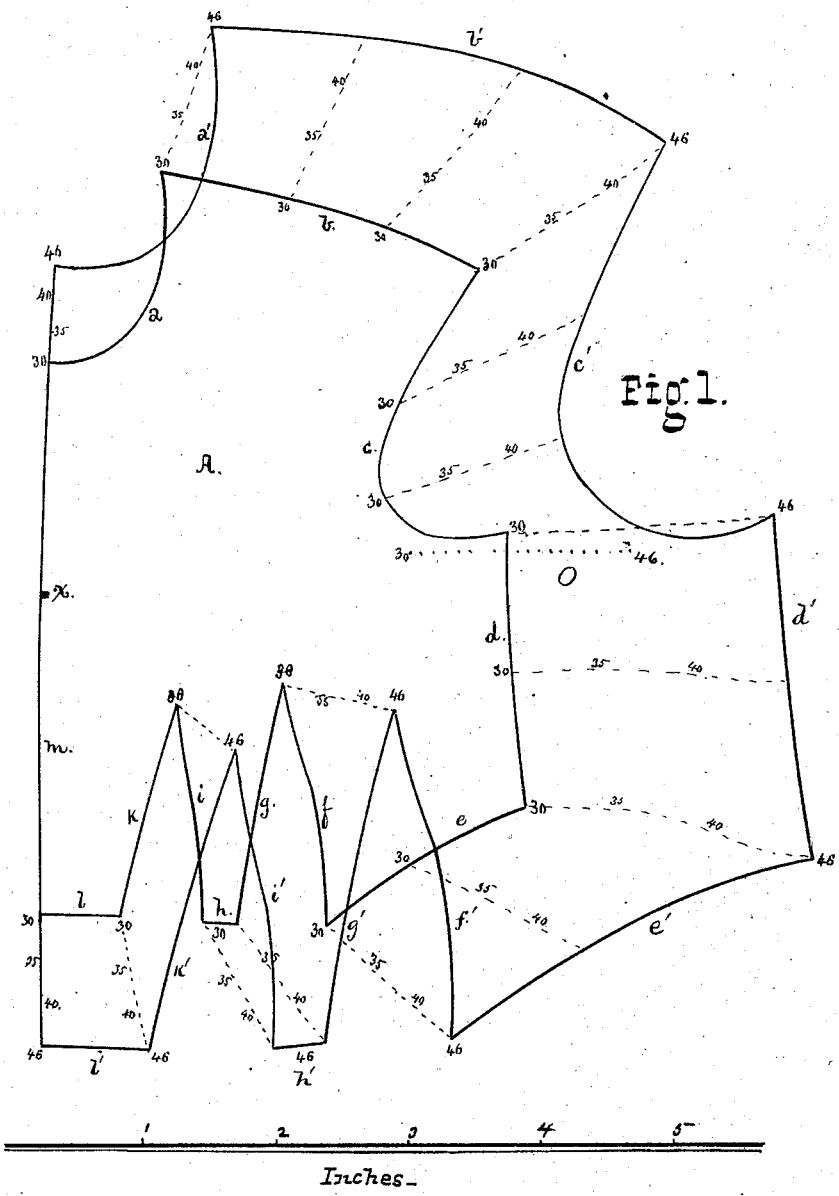

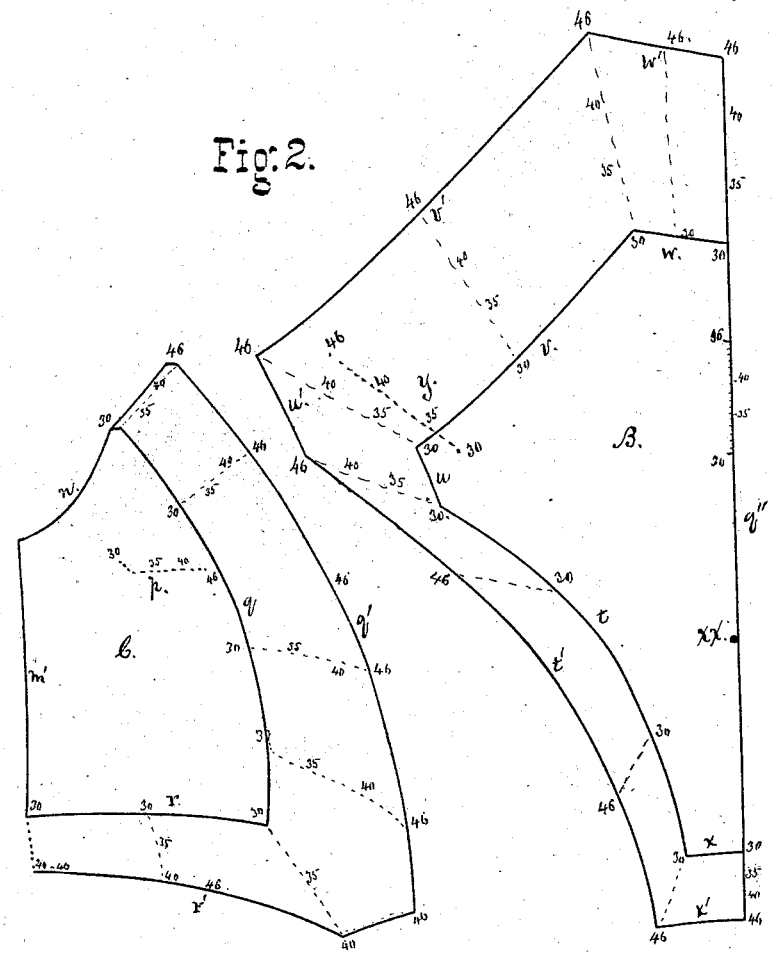

9 Sheets—Sheet 3.
E. J. LINCK.
Pattern-Chart for Drafting Garments.
No. 224,832. Patented Feb. 24, 1880.
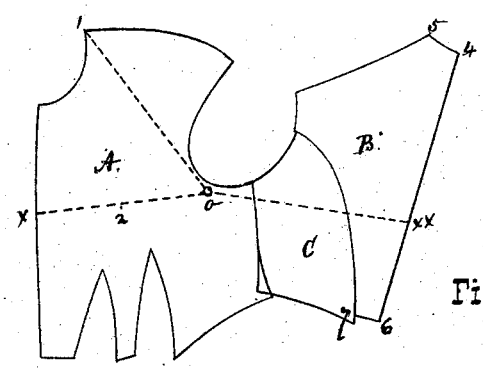
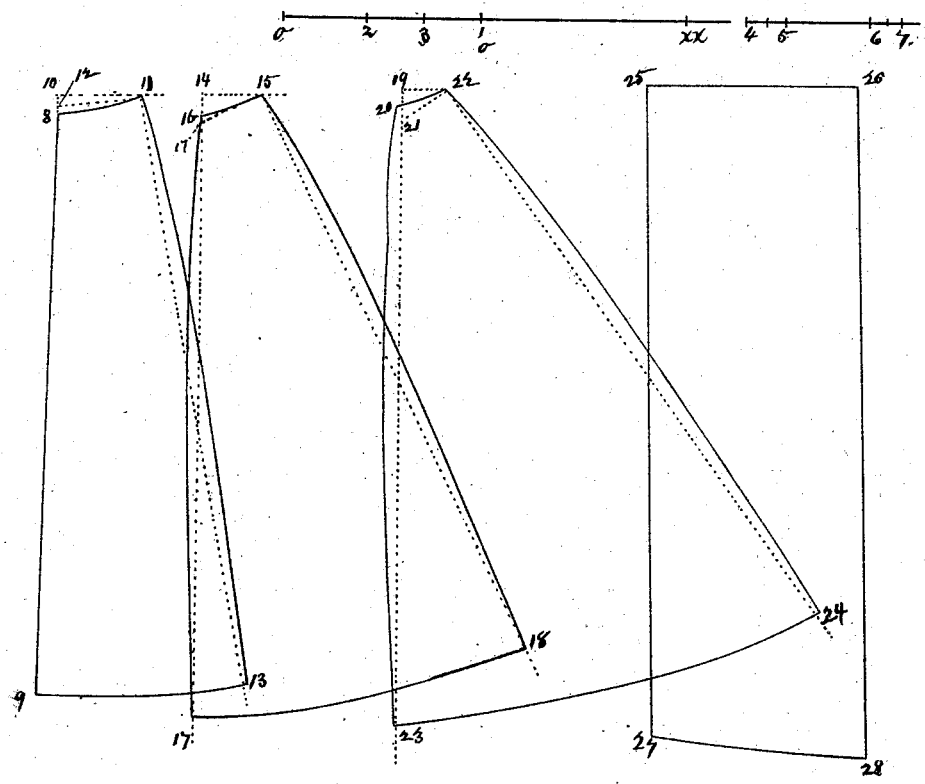
Witnesses,
John C. Gittinger.
Dr L. H. Barclay.
Inventor
Emil J. Linck.
by
R. W. Williams.
Attorney.

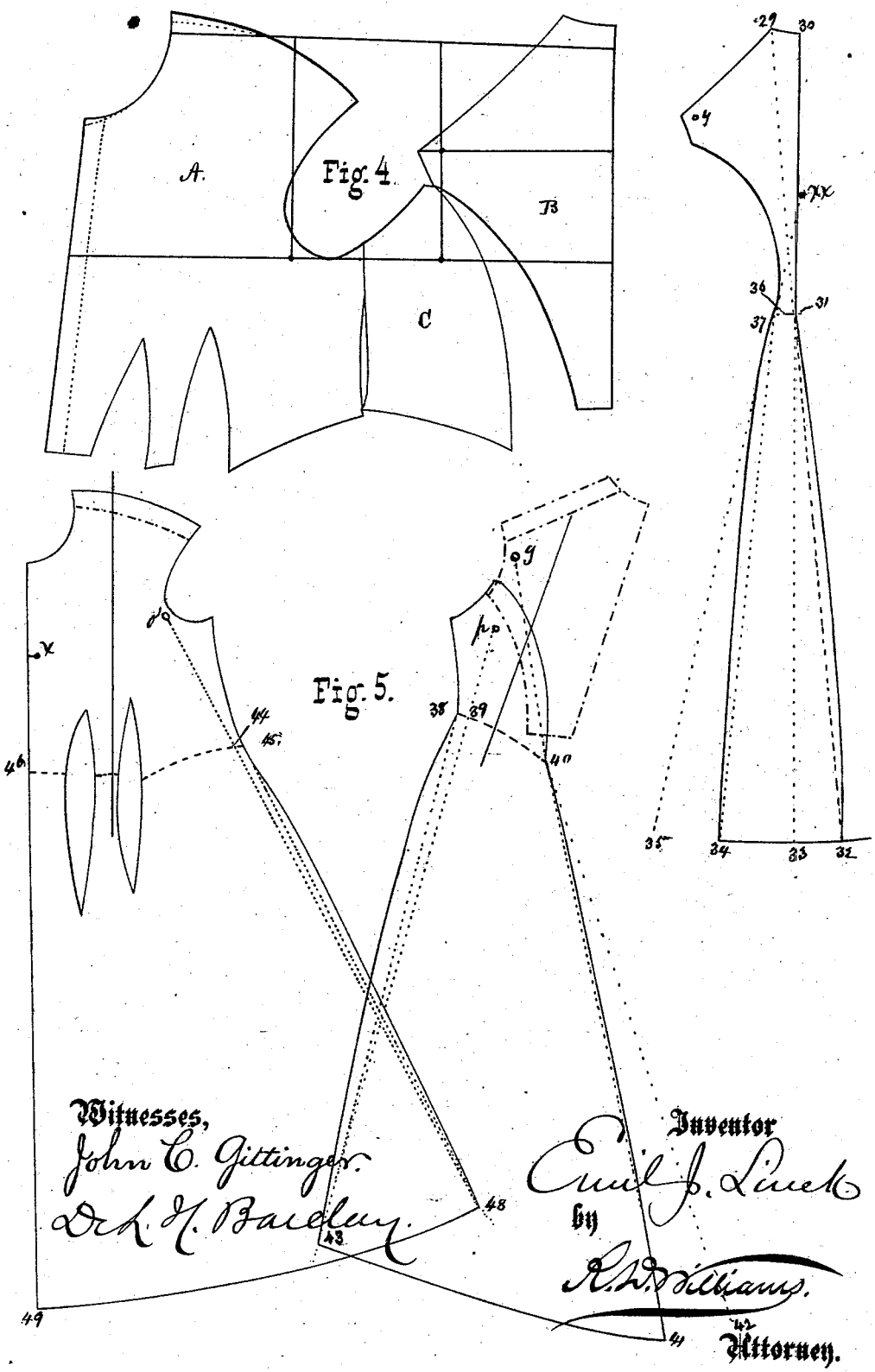

9 Sheets—Sheet 5.

E. J. LINCK.
Pattern-Chart for Drafting Garments.

No. 224,832. Patented Feb. 24, 1880.

Witnesses,
John C. Gittinger
Dr. L. H. Barclay

Inventor
Emil J. Linck
by
R. D. Williams.
Attorney.

9 Sheets—Sheet 6.

E. J. LINCK.
Pattern-Chart for Drafting Garments.

No. 224,832. Patented Feb. 24, 1880.

Witnesses,
John C. Gittinger.
L. H. Barclay.

Inventor
Emil J. Linck
by
R. D. Williams.
Attorney.

N. PETERS, PHOTO-LITHOGRAPHER, WASHINGTON, D. C.

9 Sheets—Sheet 8.
E. J. LINCK.
Pattern-Chart for Drafting Garments.
No. 224,832.   Patented Feb. 24, 1880.
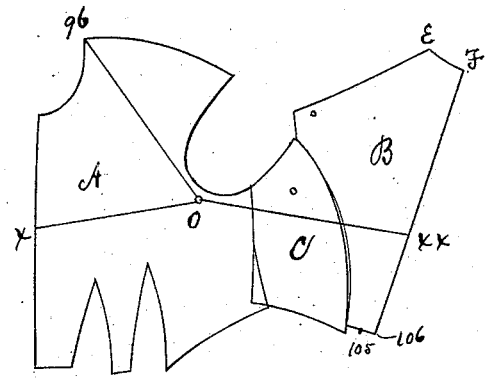
Fig. 11.
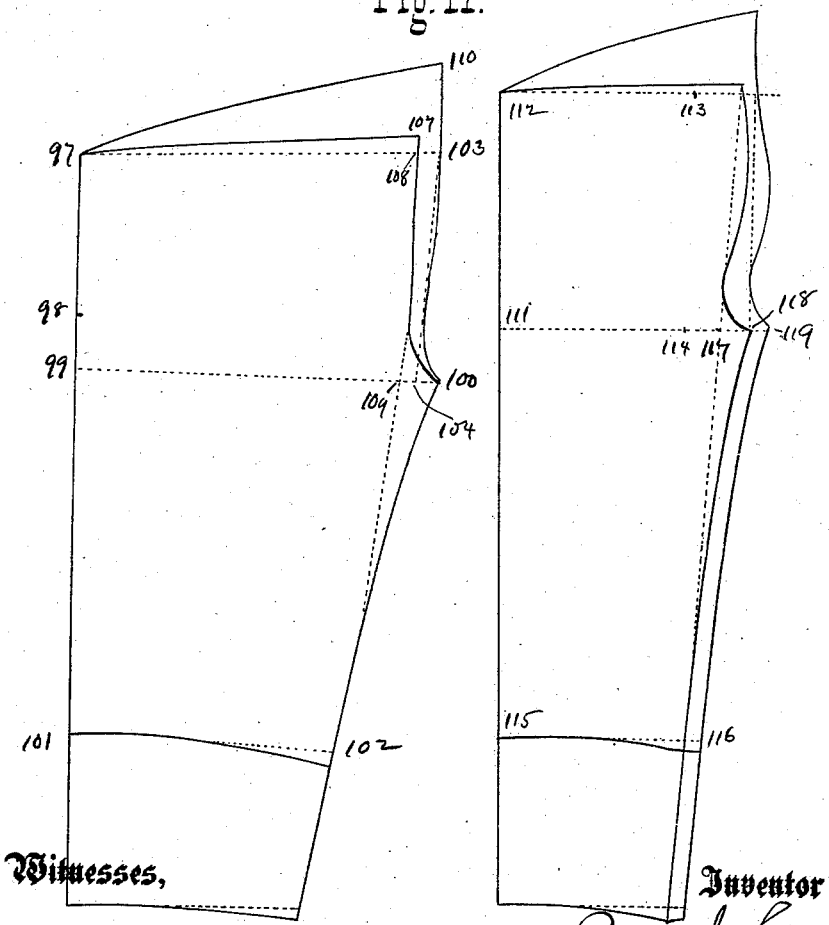
Witnesses,
L. H. Barclay
John C. Gittinger
Inventor
Emil J. Linck
by
R. D. Williams.
Attorney.

9 Sheets—Sheet 9.
E. J. LINCK.
Pattern-Chart for Drafting Garments.
No. 224,832. Patented Feb. 24, 1880.
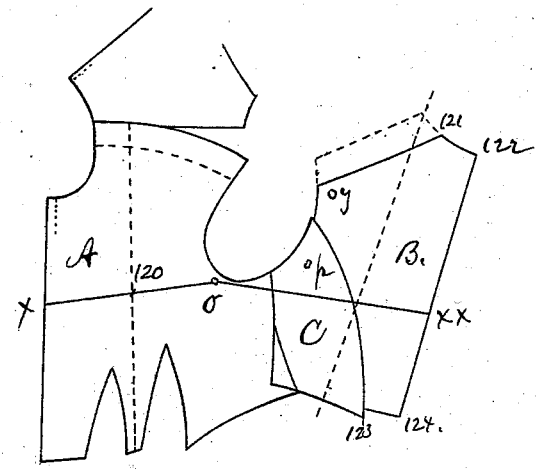
Fig. 12.
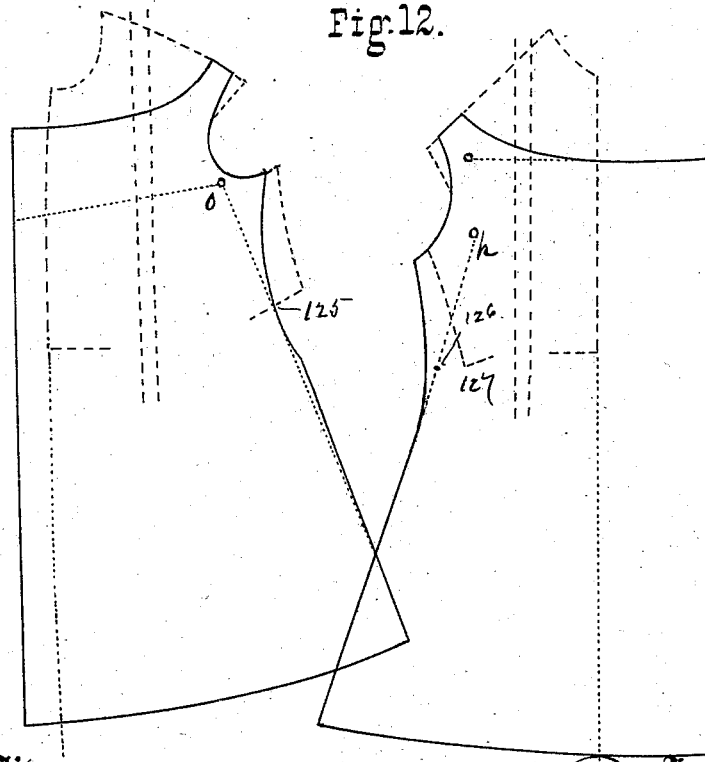
Witnesses,
John C. Gittinger.
Dr. L. H. Barclay.
Inventor
Emil J. Linck
by
R. W. Williams.
Attorney.
N. PETERS, PHOTO-LITHOGRAPHER, WASHINGTON, D.C.

UNITED STATES PATENT OFFICE.

EMIL J. LINCK, OF BALTIMORE, MARYLAND.

PATTERN-CHART FOR DRAFTING GARMENTS.

SPECIFICATION forming part of Letters Patent No. 224,832, dated February 24, 1880.

Application filed October 14, 1879.

*To all whom it may concern:*

Be it known that I, EMIL J. LINCK, of Baltimore city, State of Maryland, have invented certain new and useful Improvements in Pattern-Charts for Cutting Garments; and I hereby declare the same to be fully, clearly, and exactly described as follows:

I have devised a chart provided with certain arbitrary points of measurement, whereby, upon following out the directions hereinafter given, every description of garment for ladies' wear may be drafted and cut.

In the accompanying drawings, Figure 1 is a plan view of the front-body chart A, which is of the shape shown, having the contour $a\ b\ c\ d\ e\ f\ g\ h\ i\ k\ l\ m$ laid off for a bust-measure of thirty inches, and the corresponding contour $a'$ to $l'$ ($m$ being in common) for a bust-measure of forty-six inches, which are practically the extreme limits. The lines of figures connecting salient and corresponding points are from 30 to 46, inclusive, and are formed in perforations, as usual. It will be seen that the chart has an arbitrary point, $x$, and an arbitrary scale, $o$, whose location can only be definitely expressed by stating that the original drawings, Figs. 1 and 2, are drawn to scale one-third full size, on the assumption that the scale below (Fig. 1) truly represents inches.

Fig. 2, B is the chart of the back, having contours $t\ u\ v\ w\ x, t'\ x'$, ($q''$ being in common,) and being perforated on the salient lines from 30 to 46, as before described.

C is the chart of the side, having contours $q\ r\ q'\ r'$, ($m'$ and $n$ being in common.) Similar perforations, from 30 to 46, connect the two contours. Arbitrary scales $p$ and $y$ and point $x\ x$ are shown, whose functions will be hereinafter set forth.

For a dress, &c., five measures are taken: First, length of waist, measured down the middle of the back; second, breast-measure; third, waist-measure; fourth, length of sleeve; fifth, length of skirt in front.

In drafting a properly-proportioned dress-body the breast-measure is taken—say thirty-six inches—and the pattern-chart being laid upon a piece of paper, a pencil-mark is made in the 36-hole all around. The points so marked being connected by lines, the whole is cut out, and constitutes a pattern of proper proportions. Since, however, every person is not symmetrically proportioned, the measurements must of course be modified accordingly, as will be readily understood.

I will now proceed to describe the use of the chart in cutting various articles of apparel *seriatim:*

Fig. 3 represents the six-gored walking-dress. Here A, B, and C are the parts of the dress-body pattern, which are laid together as shown. I mark on a strip of paper $\frac{1}{3} x\ o$ ($o$ being the hole of the arbitrary scale O, indicated by the breast-measure;) also distances $o\ 1$ and $o\ x\ x$; lay them out as a scale, marking 3 midway between 1 and 2, also 4—5 and 6—7 from the marks on chart.

First, the front gore. I make 8—9 the desired front length of skirt. Lay out 10—11=$o$ —2, 10—12=$\frac{1}{3}$ of 6—7, and 10—8=$\frac{1}{2}$ 4—5. Lay out 11—13 at right angles to 11—12. Make 11 —13=8—9+$\frac{1}{5}$ difference between front length and back length of skirt.

Second, the front-side gore. I make 14—15=2—3, 14—17=6—7, 14—16=$\frac{1}{2}$ of 4—5. Make 15—18=16—17+$\frac{2}{5}$ difference between front and back length of skirt, and 16—17= 11—13.

Third, the rear-side gore. I make 20—23=15 —18, 19—22=3—1; 19—21=4—5, 19—20=$\frac{1}{2}$ of 4—5. Lay out 22—24 at right angles to 21 —22 and make it =15—18+$\frac{4}{5}$ difference between front and back length of skirt.

Fourth, the back gore. I make 25—26=1— $x\ x$. Lay out 25—27 and 26—28 at right angles to 25—26, making 25—27=22—24 and 26 —28 of the desired rear length of skirt. Now sweep out the cutting-lines in a gentle curve outside the straight dotted lines on side seams, as shown, curving the gores properly at the bottom. The fullness of skirt is to be gathered or plaited, as desired.

Fig. 4 represents a pattern of a dress-body, taken from the chart, of one-fifth natural size, for a breast-measure of thirty-seven inches on the scale, Fig. 1.

Fig. 5, the gored dress:

First. Lay down the back B, and produce 30—31 to 33, $x\ x$—36 to 34, and $x\ x$—37 to 35. It being preferred to give half the spring of the rear-side gore to the middle seam, we produce 29—31 to 32. The difference between the lengths of side seams is distributed as above described.

Second, the side gore. Lay down the chart, as shown; make $38-39=\frac{1}{2}$ of $37-31$; produce $p-40$ to $42$, making $40-41=37-34$, and $38-43=$ required length of front $+\frac{1}{2}$ difference between front and back lengths. Produce $p-39$ to meet $38-43$, as shown.

Third, the front gore. Make $44-45=\frac{1}{2}$ of $37-31$, produce $o-44$, making $44-48=38-43$, and $46-49$ the desired front length of skirt. A lap of three-fourths of an inch in front is allowed in the above. If the dress is to be closed in the back, the lap is transferred.

Fig. 6, the loose sack, (mantle:)

First, the back. Make $49-50=\frac{1}{2}$ of $51-52$, produce $54-52$ to $60$, $p-61$ to $57$, making the lines of the desired length. For a mantle, $55-52$ is produced to $59$, and $p-62$ to $58$. The cloth is cut on the heavy lines.

Second, the front. Make $64-63=\frac{1}{2}$ of $54-53$, produce $o-63$, as may be desired for length. For a mantle, $o-66$ is produced as shown, $64-66=54-53$.

Figure 7:
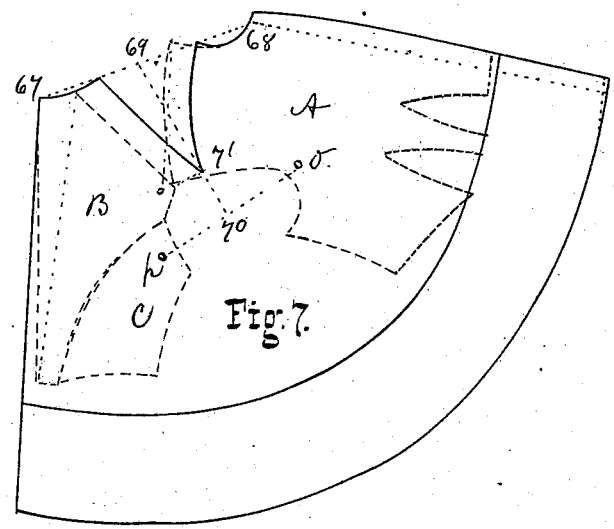

Fig. 7, the cape. Lay the back, front, and side patterns as shown; divide $p-o$ in center; connect 70 with 69, which is midway between 67 and 68 and from 71, which is $\frac{1}{3}$ of $70-69$ from 70. Curve the lines for shoulder-seam, as shown.

Figure 8:
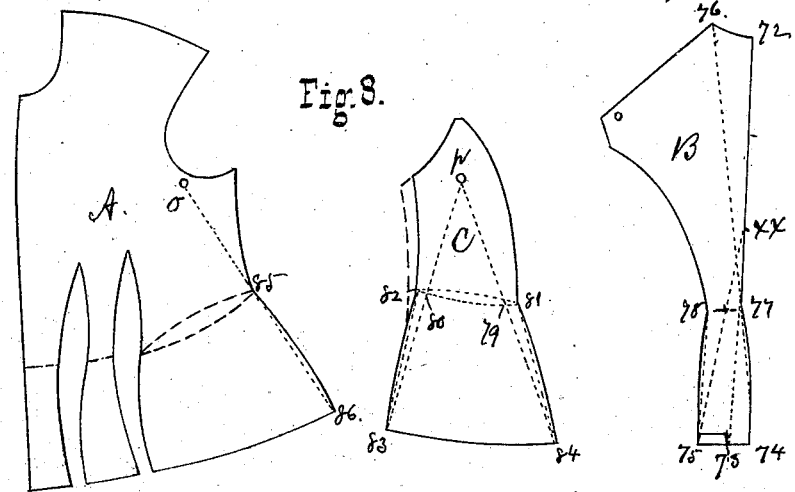

Fig. 8, the basque:

First, the back. Make $72-73$ the desired length, and draw $xx-75$ through middle of $77-78$ and $76-74$ through 77.

Second, the side. Make $79-81$ and $80-82=\frac{1}{2}$ of $77-78$, and through 79 and 80 draw $83\ p$ and $84\ p$ of the desired length, the latter being of course the same as the side of the back.

Third, the front. Here it is only necessary to draw $o-86$ through 85 to give proper spring, the length being determined by that of the side 82 of the side body.

Figure 9:
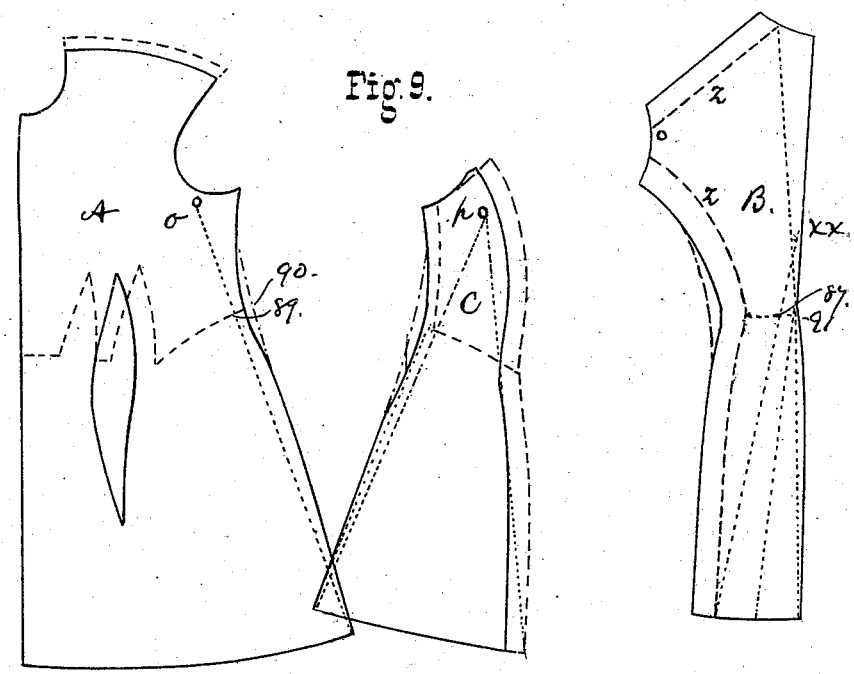

Fig. 9, the paletot:

First, the back. The short broken lines $z\ z$ represent the outline of the chart. I proceed as in the case of Fig. 8, allowing, however, the lap on shoulder and side seam shown. Also in, second, the side.

Third, the front. The line $o-89$ is produced through 89, $89-90=87-91$. But one dart is made.

Figure 10:
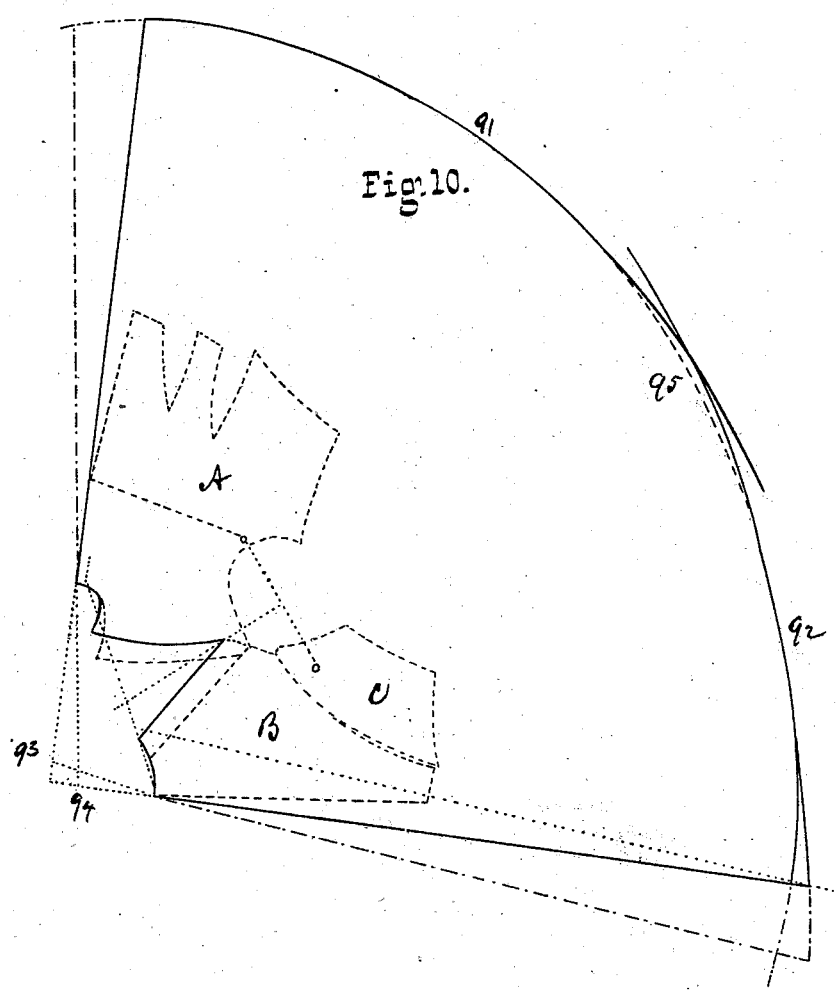

Fig. 10, the waterproof cloak. Proceed as in the case of cape. The curves 91 92 are described, 94 and 93 being rounded to meet, as shown at 95. The broken lines show the contour of a water-proof mantle somewhat wider than the cloak, and suitable to be worn over ball-dresses, &c.

Fig. 11, the drawers:

First, the loose drawers. Make $97-98=o\ x$, $98-99=\frac{1}{3}$ of $o\ x$, $99-101=2\ o\ x$, which will be of a length to reach to about the middle of the calf. Lay out $97-103$ and $99-104=2\ o\ x$, making $108-107$, $108-103$, $104-109=105-106$, and $104-100=2(106-106,)$ also $103-110=\frac{1}{2}$ of $o\ x$. Connect the points, as shown, and cut for front and back.

Second, for the trousers, (tight drawers,) proceed for outside as in previous case. Make $112-113$ and $111-114=o-96$, and $115-116=o\ x-$, $114-117=\frac{1}{2}EF$, $117-118=105-106$, $118-119=105-106$. Connect by curves, as shown, determining the upper corners as in previous case.

Fig. 12, the chemise:

First, the front. Lay down chart, and mark out lines in the proportions shown, producing $o-125$, through 125 for the spring of skirt.

Second, the back. Make $126-127=\frac{1}{2}(121-122,)$ and through 126 draw a line from $p$ for spring of skirt. Cut in the proportions shown.

I would here remark that in the foregoing description I have been particular to give such full directions as to, in a measure, show the theory as well as the practice of my mode of cutting garments, perhaps to the extent of being unnecessarily prolix, in view of the fact that the drawings correctly give proportions, and it would have been only necessary, for all practical purposes, to instruct the reader to simply follow the proportions given.

It will be observed that the salient features of the chart consist in the arbitrary points $x$, $x\ x$, and the proper holes of the arbitrary scales $O\ p\ y$, together with the middle point and lower corners of the chart of the back.

Of course, in the case of outer garments, such as basques, paletots, &c., suitable allowance must be made in view of the facts that they are to be worn over all and are of heavy material.

I have considered it unnecessary to give any patterns for sleeves, as in that respect fashions and tastes are so varied.

What I claim is—

1. The pattern-chart herein described, consisting of a dress-body pattern provided with the arbitrary scales $O\ p\ y$ and the arbitrary points $x$, $x\ x$, whereby all manner of garments for female wear may be drafted, as set forth.

2. The front-body chart A, having the point $x$ and scale O, and adapted for use in connection with the side-body and back-body charts C and B, as set forth.

3. The side-body chart C, having the arbitrary scale $p$, and adapted for use in connection with the front-body and back-body charts A and B, as set forth.

4. The back-body chart B, having point $x\ x$ and scale $y$, and adapted for use in connection with the front-body and side-body charts A and C, as set forth.

Witness my hand this 11th day of October, 1879.

EMIL J. LINCK.

Witnesses:
R. D. WILLIAMS,
JOHN C. GITTINGER.